United States Patent
Wang

(10) Patent No.: US 10,832,686 B2
(45) Date of Patent: Nov. 10, 2020

(54) METHOD AND APPARATUS FOR PUSHING INFORMATION

(71) Applicant: Baidu Online Network Technology (Beijing) Co., Ltd., Beijing (CN)

(72) Inventor: Wenyu Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 157 days.

(21) Appl. No.: 16/105,322

(22) Filed: Aug. 20, 2018

(65) Prior Publication Data

US 2019/0088262 A1    Mar. 21, 2019

(30) Foreign Application Priority Data

Sep. 19, 2017    (CN) .......................... 2017 1 0846650

(51) Int. Cl.
*G10L 17/22* (2013.01)
*G06F 9/4401* (2018.01)
(Continued)

(52) U.S. Cl.
CPC ............ *G10L 17/22* (2013.01); *G06F 9/4418* (2013.01); *G06F 16/61* (2019.01); *G06F 16/683* (2019.01);
(Continued)

(58) Field of Classification Search
CPC ......... G10L 17/22; G10L 17/00; G10L 17/02; G10L 17/04; G10L 17/06; G10L 17/26
(Continued)

(56) References Cited

U.S. PATENT DOCUMENTS

| 10,102,844 B1 * | 10/2018 | Mois ................... G06F 16/3329 |
| 2015/0142438 A1 * | 5/2015 | Dai .......................... G10L 17/22 704/246 |

(Continued)

FOREIGN PATENT DOCUMENTS

| CN | 103730114 A | 4/2014 |
| CN | 104575504 A | 4/2015 |

(Continued)

*Primary Examiner* — Qi Han
(74) *Attorney, Agent, or Firm* — Knobbe, Martens, Olson & Bear, LLP

(57) ABSTRACT

The present disclosure discloses a method and apparatus for pushing information. A specific embodiment of the method comprises: receiving voice information sent through a terminal by a user, the voice information including awakening voice information and querying voice information; extracting a voiceprint characteristic from the awakening voice information to obtain voiceprint characteristic information; matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information; and pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

9 Claims, 4 Drawing Sheets

(51) Int. Cl.
    *G10L 17/02*     (2013.01)
    *G10L 17/06*     (2013.01)
    *G06F 16/61*     (2019.01)
    *G06F 16/683*     (2019.01)
    *G10L 17/08*     (2013.01)

(52) U.S. Cl.
    CPC .............. *G10L 17/02* (2013.01); *G10L 17/06* (2013.01); *G10L 17/08* (2013.01)

(58) Field of Classification Search
    USPC ....... 704/246, 251, 255, 256, 231, 238, 239, 704/240, 243, 245, 275, 270, 1, 257
    See application file for complete search history.

(56) References Cited

U.S. PATENT DOCUMENTS

| | | | |
|---|---|---|---|
| 2018/0047386 A1* | 2/2018 | Garner | .................... G10L 15/08 |
| 2018/0144742 A1 | 5/2018 | Ye et al. | |
| 2018/0293236 A1 | 10/2018 | Xiang | |
| 2019/0027138 A1* | 1/2019 | Wang | .................. G10L 15/1815 |

FOREIGN PATENT DOCUMENTS

| | | | |
|---|---|---|---|
| CN | 105933413 A | 9/2016 | |
| JP | 201737222 A | 2/2017 | |

* cited by examiner

METHOD AND APPARATUS FOR PUSHING INFORMATION

CROSS-REFERENCE TO RELATED APPLICATIONS

This application is related to and claims priority from Chinese Application No. 201710846650.1, filed on Sep. 19, 2017 and entitled "Method and Apparatus for Pushing Information," the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

In recent years, the artificial intelligence technology has been deeply developed, and related products have been gradually produced, especially intelligent voice chat products, for example, an intelligent loudspeaker box and an intelligent robot. The intelligent voice chat products including the intelligent loudspeaker box and the intelligent robot are typically used in homes. The home user may interact with the intelligent voice chat products using voice, to make a service request. The intelligent voice chat products provide the service for the home user using a set of universal answering rules.

However, there are a plurality of users in each home usually, and different users may have different requirements. Therefore, how to recognize each user among the home users and provide the each user with a service meeting personalized needs of the user is a urgent problem to be solved.

SUMMARY

An objective of the present disclosure is to provide an improved method and apparatus for pushing information to solve one or more technical problems mentioned in the foregoing Background section.

In a first aspect, embodiments of the present disclosure provide a method for pushing information. The method includes: receiving voice information sent through a terminal by a user, the voice information including awakening voice information and querying voice information, and the awakening voice information being used to switch the terminal from a standby state to a wake-up state; extracting a voiceprint characteristic from the awakening voice information to obtain voiceprint characteristic information; matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information; and pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

In some embodiments, the method further includes: determining, in response to the voiceprint characteristic information not successfully matching the registration voiceprint information in the registration voiceprint information set, whether a number of pieces of registration voiceprint information included in the registration voiceprint information set exceeds a preset number threshold; deleting, if the number of pieces of registration voiceprint information exceeds the preset number threshold, registration voiceprint information having least user behavior data in the registration voiceprint information set; and establishing registration voiceprint information of the user based on the awakening voice information, and storing the established registration voiceprint information into the registration voiceprint information set.

In some embodiments, the establishing registration voiceprint information of the user based on the awakening voice information includes: importing the awakening voice information into a pre-trained universal background model for mapping to obtain a first voiceprint characteristic super-vector, wherein the universal background model is used to represent a corresponding relationship between voice information and a voiceprint characteristic super-vector; performing a dimensionality reduction on the first voiceprint characteristic super-vector to obtain first registration voiceprint characteristic information; generating a first voiceprint identifier of the first registration voiceprint characteristic information, and associating and storing user behavior data of the user and the first voiceprint identifier; and using the first registration voiceprint characteristic information, the first voiceprint identifier, and the user behavior data of the user as the registration voiceprint information of the user.

In some embodiments, the extracting a voiceprint characteristic from the awakening voice information to obtain voiceprint characteristic information includes: importing the awakening voice information into a pre-trained universal background model for mapping to obtain the voiceprint characteristic super-vector, wherein the universal background model is used to represent a corresponding relationship between voice information and a voiceprint characteristic super-vector; and performing a dimensionality reduction on the voiceprint characteristic super-vector to obtain the voiceprint characteristic information.

In some embodiments, the each piece of registration voiceprint information in the registration voiceprint information set further includes a voiceprint identifier corresponding to the registration voiceprint characteristic information. For the each piece of registration voiceprint information in the registration voiceprint information set, the registration voiceprint characteristic information and the user behavior data included in the registration voiceprint information and the voiceprint identifier of the registration voiceprint information are associated and stored.

In a second aspect, the embodiments of the present disclosure provide an apparatus for pushing information. The apparatus includes: a receiving unit, configured to receive voice information sent through a terminal by a user, the voice information including awakening voice information and querying voice information, and the awakening voice information being used to switch the terminal from a standby state to a wake-up state; an extracting unit, configured to extract a voiceprint characteristic from the awakening voice information to obtain voiceprint characteristic information; a matching unit, configured to match the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information; and a pushing unit, configured to push, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

In some embodiments, the apparatus further includes: a determining unit, configured to determine, in response to the voiceprint characteristic information not successfully matching the registration voiceprint information in the registration voiceprint information set, whether a number of pieces of registration voiceprint information included in the registration voiceprint information set exceeds a preset number threshold; a deleting unit, configured to delete, if the number of pieces of registration voiceprint information exceeds the preset number threshold, registration voiceprint information having least user behavior data in the registration voiceprint information set; and a registering unit, configured to establish registration voiceprint information of the user based on the awakening voice information, and store the established registration voiceprint information into the registration voiceprint information set.

In some embodiments, the registering unit is further configured to: import the awakening voice information into a pre-trained universal background model for mapping to obtain a first voiceprint characteristic super-vector, wherein the universal background model is used to represent a corresponding relationship between voice information and a voiceprint characteristic super-vector; perform a dimensionality reduction on the first voiceprint characteristic super-vector to obtain first registration voiceprint characteristic information; generate a first voiceprint identifier of the first registration voiceprint characteristic information, and associate and store user behavior data of the user and the first voiceprint identifier; and use the first registration voiceprint characteristic information, the first voiceprint identifier, and the user behavior data of the user as the registration voiceprint information of the user.

In some embodiments, the extracting unit is further configured to: import the awakening voice information into a pre-trained universal background model for mapping to obtain a voiceprint characteristic super-vector, wherein the universal background model is used to represent a corresponding relationship between voice information and a voiceprint characteristic super-vector; and perform a dimensionality reduction on the voiceprint characteristic super-vector to obtain the voiceprint characteristic information.

In some embodiments, the each piece of registration voiceprint information in the registration voiceprint information set further includes a voiceprint identifier corresponding to the registration voiceprint characteristic information. For the each piece of registration voiceprint information in the registration voiceprint information set, the registration voiceprint characteristic information and the user behavior data included in the registration voiceprint information and the voiceprint identifier of the registration voiceprint information are associated and stored.

In a third aspect, the embodiments of the present disclosure provide a server. The server includes: one or more processors; and a storage device configured to store one or more programs. The one or more programs, when executed by the one or more processors, cause the one or more processors to implement the method as described in any implementation in the first aspect.

In a fourth aspect, the embodiments the present disclosure provide a computer readable storage medium storing a computer program. The computer program, when executed by a processor, implements the method as described in any implementation in the first aspect.

According to the method and apparatus for pushing information provided by the embodiments of the present disclosure, the voiceprint characteristic information of the user is obtained by extracting the voiceprint characteristic from the awakening voice information sent by the user. Then, the voiceprint characteristic information of the user is matched with the registration voiceprint information set. Finally, in response to the voiceprint characteristic information of the user successfully matching the registration voiceprint characteristic information in the registration voiceprint information set, the audio information is pushed to the terminal used by the user based on the querying voice information and the user behavior data corresponding to the successfully matched registration voiceprint characteristic information. Accordingly, different users are recognized, and the targeted information is pushed, thereby meeting personalized requirements of the users.

BRIEF DESCRIPTION OF THE DRAWINGS

After reading detailed descriptions of non-limiting embodiments given with reference to the following accompanying drawings, other characteristics, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
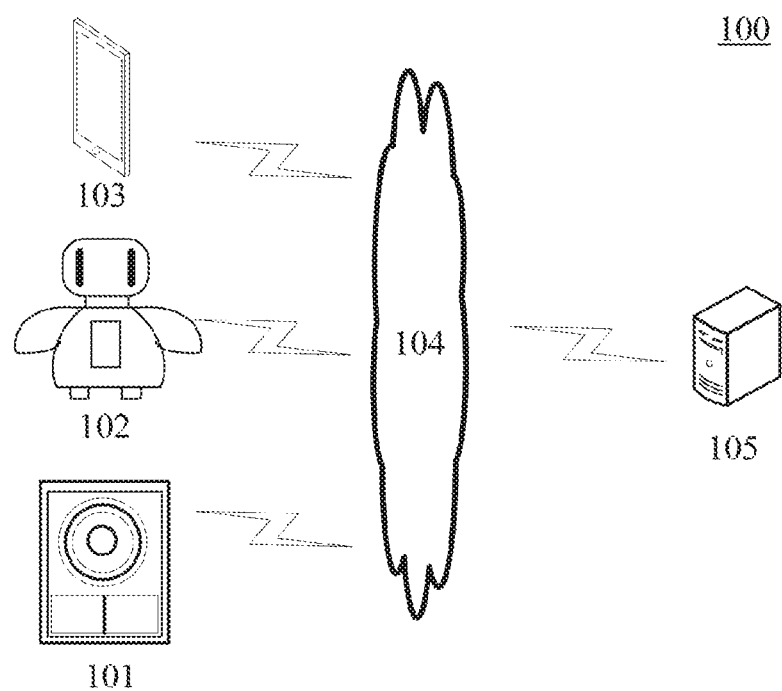
FIG. 1 is an architectural diagram of an exemplary system in which the present disclosure may be implemented.

FIG. 1 shows an architecture of an exemplary system 100 which may be used by a method for pushing information or an apparatus for pushing information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to receive or transmit messages, etc. Various client applications, such as audio playing applications, search applications, instant messaging tools, social platform software, intelligent device controlling software, and robot controlling software may be installed on the terminal devices 101, 102 and 103.

The terminal devices 101, 102 and 103 may be various electronic devices having audio playing devices and supporting audio playing, including but not limited to, intelligent loudspeaker boxes, intelligent robots, smart phones, tablet computers, laptop computers and desktop computers.

The server 105 may be a server providing various services, for example, a backend server that provides supports for the audio information played on the terminal devices 101, 102 and 103. The backend server may perform a processing including recognition on the voice information sent by the terminal devices, and return the audio information to the terminal devices based on the processing result.

It should be noted that the method for pushing information according to the embodiments of the present disclosure is generally executed by the server 105. Accordingly, an apparatus for pushing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
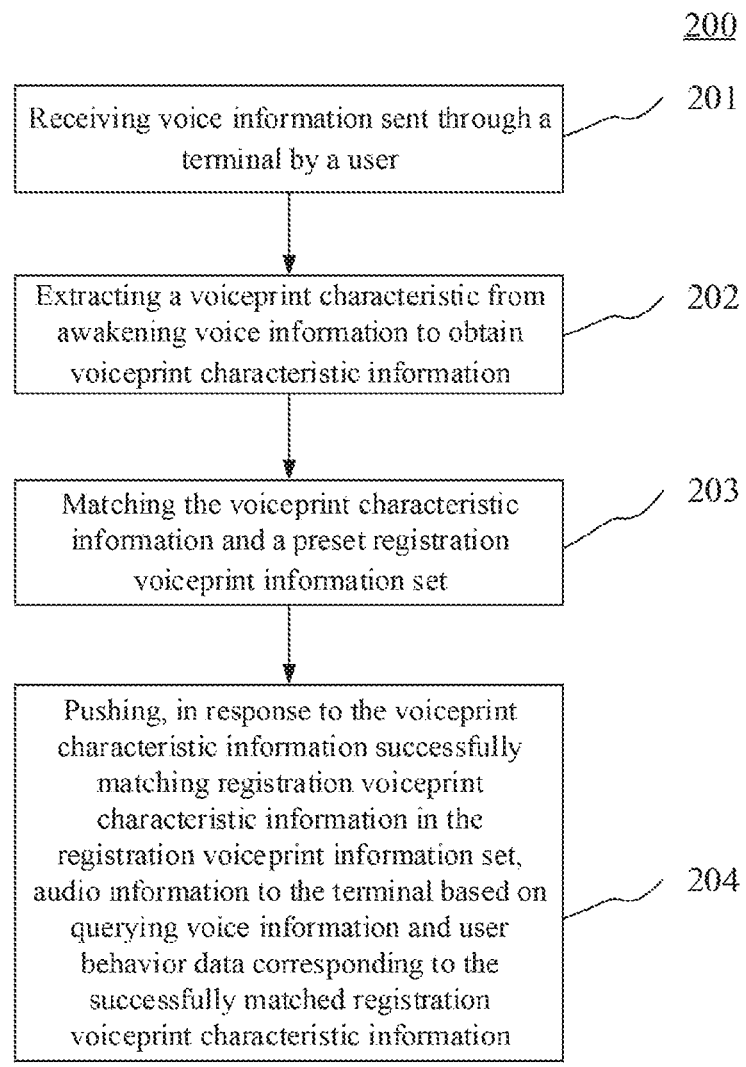
FIG. 2 is a flowchart of an embodiment of a method for pushing information according to the present disclosure.

Further referring to FIG. 2, FIG. 2 illustrates a flow 200 of an embodiment of a method for pushing information according to the present disclosure. The method for pushing information includes the following steps.

Step 201, receiving voice information sent through a terminal by a user.

In this embodiment, an electronic device (e.g., the server 105 as illustrated in FIG. 1) on which the method for pushing information is performed may receive the voice information from the terminal (e.g., the terminal devices 101, 102 and 103 as illustrated in FIG. 1) with which the user plays an audio, by means of a wired connection or a wireless connection. The voice information may include awakening voice information and querying voice information. The awakening voice information is used to switch the terminal from a standby state to a wake-up state. The awakening voice information may be preset, for example, may be a preset wake-up word or wake-up sentence. The user may switch the terminal from the standby state to the wake-up state by speaking the wake-up word or the wake-up sentence. For example, when the user uses a smart loudspeaker box, the user may switch the smart loudspeaker box from the standby state to the wake-up state by speaking the preset wake-up words "xiaodu xiaodu," so that the smart loudspeaker box starts performing a voice interaction with the user. The querying voice information may be voice information spoken by the user and used for querying information. For example, the electronic device may query the information based on the querying voice information "recommend me a song" said by the user, and thus pushes the information of the song to the user. It should be noted that the wireless connection may include, but not limited to, a 3G/4G connection, a WIFI connection, a Bluetooth connection, a WiMAX connection, a Zigbee connection, an UWB (ultra wideband) connection, or other wireless connections now known or to be developed in the future.

Step 202, extracting a voiceprint characteristic from the awakening voice information to obtain voiceprint characteristic information.

In this embodiment, the electronic device may extract the voiceprint characteristic from the awakening voice information received in step 201 to obtain the voiceprint characteristic information. A voiceprint refers to an acoustic spectrum carrying verbal information and displayed by an electro-acoustic instrument. Recent scientific research shows that the voiceprint is not only specific, but also relatively stable. Resembling the fingerprint, a voice characteristic and a pronunciation habit contained in a piece of speech of each person are almost unique. Therefore, the identity of a speaker may be recognized from the piece of speech. Here, the voiceprint characteristic information may be a vector identifying a voiceprint spectral characteristic of the user. For example, the voiceprint characteristic may be extracted from the awakening voice information by extracting a typical characteristic from the awakening voice information. Specifically, characteristics such as a wavelength, a frequency, an intensity, and a rhythm of voice can reflect the characteristics of the voice of the user. Accordingly, when the voiceprint characteristic is extracted from the awakening voice information, the characteristics such as the wavelength, the frequency, the intensity, and the rhythm in the awakening voice information may be extracted. In addition, characteristic values of the characteristics such as the wavelength, the frequency, the intensity, and the rhythm in the awakening voice information are determined, and the characteristic values of the characteristics such as the wavelength, the frequency, the intensity, and the rhythm in the awakening voice information compose the voiceprint characteristic information. As another example, the voiceprint characteristic may also be extracted from the awakening voice information by extracting an acoustics characteristic from the awakening voice information, for example, a Mel-Frequency Cepstral Coefficient. The process of extracting the Mel-Frequency Cepstral Coefficient from the awakening voice information may include pre-emphasis, framing, windowing, fast Fourier transformation, Mel filtering, logarithmic transformation, or discrete cosine transformation. It should be noted that extraction of the voiceprint characteristic from the awakening voice information is a well-known technology widely studied and applied at present, and will not be repeatedly described here.

In some alternative implementations of this embodiment, the step 202 may include the following steps.

First, the electronic device may import the awakening voice information into a pre-trained universal background model for mapping to obtain a voiceprint characteristic super-vector. The universal background model is used to represent a corresponding relationship between the voice information and the voiceprint characteristic super-vector.

As an example, the universal background model may be a corresponding relationship table predetermined by a technician based on statistics on a large amount of voice information and a large number of voiceprint characteristic super-vectors and storing corresponding relationships between a plurality of pieces of voice information and the voiceprint characteristic super-vectors.

As an example, the universal background model (UBM) may also be a Gaussian Mixture Model (GMM) trained by using a large number of voice samples of different speakers using a machine learning method. In practice, the awakening voice information may be imported into the universal background model to obtain the voiceprint characteristic super-vector in the following ways. The awakening voice information is transformed into a short-time spectral characteristic sequence, and a posterior probability of each frame of spectral characteristic on each Gaussian component in the universal background model is calculated. A mean value of the each Gaussian component in the Gaussian Mixture Mode of the user is adaptively obtained using a maximum posterior probability criterion. Then, the obtained mean value of the each Gaussian component is stitched to form the voiceprint characteristic super-vector.

It should be noted that the training the universal background model and the process of importing the awakening voice information into the universal background model to obtain the voiceprint characteristic super-vector are the existing technologies widely studied and applied at present, and will not be repeatedly described here.

Then, the electronic device may perform a dimensionality reduction on the voiceprint characteristic super-vector to obtain the voiceprint characteristic information.

Here, the electronic device may perform the dimensionality reduction on the voiceprint characteristic super-vector using various methods. For example, the dimensionality reduction may be performed on the voiceprint characteristic super-vector to obtain a voiceprint characteristic vector using a joint factor analysis (JFA) method, a probabilistic linear discriminant analysis (PLDA) algorithm, a linear discriminant analysis (LDA) algorithm or an identifying vector (I-Vector). It should be noted that the various methods for the dimensionality reduction are the existing technologies widely studied and applied at present, and will not be repeatedly described here.

Step 203, matching the voiceprint characteristic information and a preset registration voiceprint information set.

In this embodiment, the electronic device may match the voiceprint characteristic information obtained in step 202 and registration voiceprint characteristic information in the preset registration voiceprint information set. For example, a matching degree between the voiceprint characteristic information and each piece of registration voiceprint characteristic information in the registration voiceprint information set may first be calculated. For example, the matching degree may be calculated using a method such as a Manhattan distance, a Minkowski distance, or a cosine similarity. Then, it is determined whether the voiceprint characteristic information successfully matches the registration voiceprint characteristic information in the registration voiceprint information set based on the calculated matching degree. For example, the matching degree may be represented as a percentage. When the matching degree exceeds a preset threshold, it may be considered that the matching is successful. In such case, it may be considered that the user corresponding to the voiceprint characteristic information and the registration user corresponding to the successfully matched registration voiceprint characteristic information are the same user. Here, each piece of registration voiceprint information in the registration voiceprint information set may include registration voiceprint characteristic information and user behavior data of the registration user corresponding to the registration voiceprint characteristic information. Here, the user behavior data of the registration user may refer to various behavior data related to the registration user. For example, the user behavior data may be the type of the audio (e.g., song, news, or comic dialogue) played by the registration user through the terminal, the name of the played audio, or the performer of the played audio. The electronic device may analyze a preference of the registration user through the user behavior data of the registration user, and then push audio information meeting personalized requirements of the registration user to the registration user.

In some alternative implementations of this embodiment, the each piece of registration voiceprint information in the registration voiceprint information set may further include a voiceprint identifier corresponding to the registration voiceprint characteristic information. For the each piece of registration voiceprint information in the registration voiceprint information set, the registration voiceprint characteristic information and the user behavior data included in the registration voiceprint information and the voiceprint identifier of the registration voiceprint information are associated and stored correspondingly. Alternatively, the registration voiceprint information set may be associated with the same account (e.g., Baidu account). Each terminal device and the account are uniquely bound. Through the account, the terminal device is associated with the registration voiceprint information. The registration voiceprint information may be registered through any terminal device under the account. Once the registration voiceprint information is registered, the registration voiceprint information may be used in any terminal device under the account.

Step 204, pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

In this embodiment, in response to the voiceprint characteristic information successfully matching the registration voiceprint characteristic information in the registration voiceprint information set, it is determined that the user corresponding to the voiceprint characteristic information and the registration user corresponding to the successfully matched registration voiceprint characteristic information are the same user. The electronic device may push the audio information to the terminal based on the querying voice information and the user behavior data corresponding to the successfully matched registration voiceprint characteristic information. Specifically, the electronic device may perform voice recognition on the querying voice information sent by the user to obtain a user requirement. Then, the electronic device obtains the audio information meeting the personalized requirement of the user based on the user requirement and the successfully matched registration voiceprint characteristic information, and pushes the audio information to the terminal used by the user.

In some alternative implementations of this embodiment, the method for pushing information may further include the following steps. In response to the voiceprint characteristic information not successfully matching the registration voiceprint information in the registration voiceprint information set, the electronic device may further determine whether a number of pieces of registration voiceprint information included in the registration voiceprint information set exceeds a preset number threshold. The number threshold may be manually set based on actual requirements. For example, the number threshold may be defined based on an accuracy rate of voiceprint recognition. For example, it may be set that the higher the accuracy rate is, the smaller the number threshold is. Here, the accuracy rate of the voiceprint recognition may refer to a probability of recognizing a user as himself based on voiceprint characteristic information of the user. If the number of pieces of registration voiceprint information included in the registration voiceprint information set exceeds the preset number threshold, the electronic device may delete registration voiceprint information having least user behavior data in the registration voiceprint information set, establish the registration voiceprint information of the user based on the awakening voice information, and store the established registration voiceprint information into the registration voiceprint information set. In general, an amount of the user behavior data may represent an activity of the user. If the user behavior data are too little, it may be considered that the user corresponding to the user behavior data is a "visitor" temporarily using the terminal device. Or, it may be considered that the user behavior data are generated due to incorrect recognition of the user, that is, it is useless to store the user behavior data. Therefore, the registration voiceprint information corresponding to the user behavior data may be deleted, which avoids wasting the storage space. If the number of pieces of registration voiceprint information does not exceed the preset number threshold, the electronic device may establish the registration voiceprint information of the user based on the awakening voice information, and store the established registration voiceprint information into the registration voiceprint information set. Here, the electronic device may establish the registration voiceprint information of the user based on the awakening voice information, without resending registration voice information by the user, thereby achieving the registration for the user in a state where the user is unaware. Accordingly, the registration process may be simplified, and the user experience may be improved.

In some alternative implementation, the establishing the registration voiceprint information of the user based on the awakening voice information may be performed as follows. First, the electronic device may import the awakening voice information into the pre-trained universal background model (UBM) for mapping to obtain a first voiceprint characteristic super-vector. The universal background model is used to represent the corresponding relationship between the voice information and the voiceprint characteristic super-vector. Second, the electronic device may perform a dimensionality reduction on the first voiceprint characteristic super-vector to obtain first registration voiceprint characteristic information. For the specific process, reference may be made to the alternative implementations of step 202, which will not be repeatedly described here. Then, the electronic device may generate a first voiceprint identifier of the first registration voiceprint characteristic information. For example, the electronic device may randomly generate the first voiceprint identifier uniquely corresponding to the first registration voiceprint characteristic information, and associate and store the user behavior data of the user and the first voiceprint identifier. Finally, the electronic device may use the first registration voiceprint characteristic information, the first voiceprint identifier, and the user behavior data of the user as the registration voiceprint information of the user.

Figure 3:
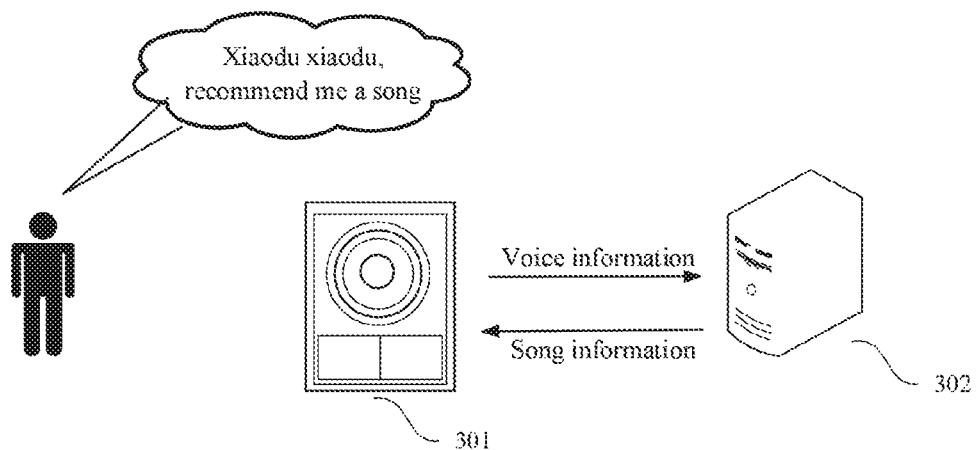
FIG. 3 is a schematic diagram of an application scenario of the method for pushing information according to the present disclosure.

Further referring to FIG. 3, FIG. 3 is a schematic diagram of an application scenario of the method for pushing information according to the present disclosure. In the application scenario of FIG. 3, the user first sends the voice information "Xiaodu xiaodu, recommend me a song." to the terminal 301. Then, the server 302 receives the voice information, extracts the voiceprint characteristic from the awakening voice information "Xiaodu xiaodu" in the voice information to obtain the voiceprint characteristic information. Next, the server 302 matches the voiceprint characteristic information and the registration voiceprint information set. Finally, in response to the voiceprint characteristic information successfully matching the registration voiceprint characteristic information in the registration voiceprint information set, the server 302 may perform voice recognition on the querying voice information "recommend me a song" to obtain the requirement that the user wants to listen to the song, and analyze the user behavior data corresponding to the successfully matched registration voiceprint characteristic information to obtain the preference of the user (e.g., which type of song is preferred by the user, which singer's song is preferred by the user, or which song is preferred by the user). The server 302 pushes information of the song to the terminal 301 based on the user requirement and the user preference, to make the terminal 301 play the song for the user.

In the method provided by embodiments of the present disclosure, different users are recognized through the awakening voice information sent by the users. The audio information is pushed to the terminal used by the user based on the querying voice information sent by the user and the user behavior data corresponding to the successfully matched registration voiceprint characteristic information. Accordingly, different users are recognized, and the targeted information is pushed, thereby meeting the personalized requirements of the users.

Figure 4:
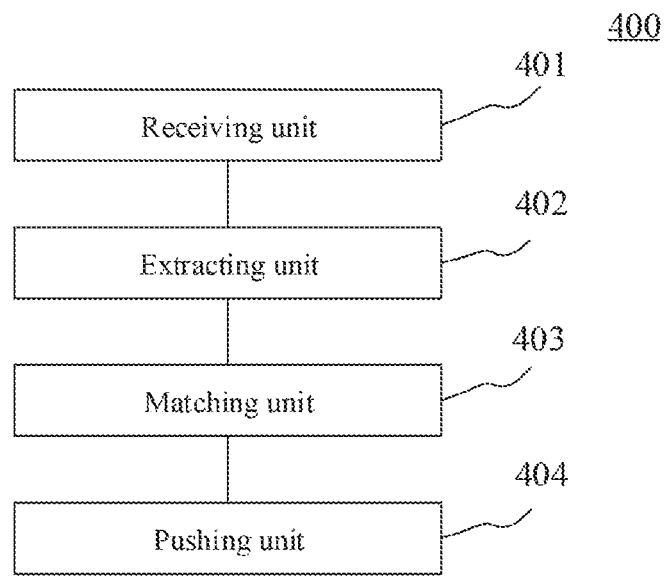
FIG. 4 is a schematic structural diagram of an embodiment of an apparatus for pushing information according to the present disclosure.

Further referring to FIG. 4, as an implementation of the method shown in the above figures, the present disclosure provides an embodiment of an apparatus for pushing information. The embodiment of this apparatus corresponds to the embodiment of the method as illustrated in FIG. 2, and the apparatus may be applied in various electronic devices.

As shown in FIG. 4, the apparatus for pushing information 400 in this embodiment includes: a receiving unit 401, an extracting unit 402, a matching unit 403, and a pushing unit 404. The receiving unit 401 is configured to receive voice information sent through a terminal by a user. The voice information includes awakening voice information and querying voice information. The awakening voice information is used to switch the terminal from a standby state to a wake-up state. The extracting unit 402 is configured to extract a voiceprint characteristic from the awakening voice information to obtain voiceprint characteristic information. The matching unit 403 is configured to match the voiceprint characteristic information and a preset registration voiceprint information set. Each piece of registration voiceprint information in the registration voiceprint information set includes registration voiceprint characteristic information and user behavior data of a registration user corresponding to the registration voiceprint characteristic information. The pushing unit 404 is configured to push, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

In this embodiment, for the specific process of the receiving unit 401, the extracting unit 402, the matching unit 403, and the pushing unit 404 in the apparatus for pushing information 400, and their technical effects, reference may be respectively made to the related descriptions of step 201, step 202, step 203, and step 204 in the embodiment corresponding to FIG. 2, which will not be repeatedly described here.

In some alternative implementations of this embodiment, the apparatus 400 may further includes: a determining unit (not shown), configured to determine, in response to the voiceprint characteristic information not successfully matching the registration voiceprint information in the registration voiceprint information set, whether a number of pieces of registration voiceprint information included in the registration voiceprint information set exceeds a preset number threshold; a deleting unit (not shown), configured to delete, if the number of pieces of registration voiceprint information exceeds the preset number threshold, registration voiceprint information having least user behavior data in the registration voiceprint information set; and a registering unit (not shown), configured to establish registration voiceprint information of the user based on the awakening voice information, and store the established registration voiceprint information into the registration voiceprint information set.

In some alternative implementations of this embodiment, the registering unit may further be configured to: import the awakening voice information into a pre-trained universal background model for mapping to obtain a first voiceprint characteristic super-vector, wherein the universal background model is used to represent a corresponding relationship between voice information and a voiceprint characteristic super-vector; perform a dimensionality reduction on the first voiceprint characteristic super-vector to obtain first registration voiceprint characteristic information; generate a first voiceprint identifier of the first registration voiceprint characteristic information, and associate and store user behavior data of the user and the first voiceprint identifier; and use the first registration voiceprint characteristic information, the first voiceprint identifier, and the user behavior data of the user as the registration voiceprint information of the user.

In some alternative implementations of this embodiment, the extracting unit 402 may further be configured to: import the awakening voice information into a pre-trained universal background model for mapping to obtain a voiceprint characteristic super-vector, wherein the universal background model is used to represent a corresponding relationship between voice information and a voiceprint characteristic super-vector; and perform a dimensionality reduction on the voiceprint characteristic super-vector to obtain the voiceprint characteristic information.

In some alternative implementations of this embodiment, the each piece of registration voiceprint information in the registration voiceprint information set may further include a voiceprint identifier corresponding to the registration voiceprint characteristic information. For the each piece of registration voiceprint information in the registration voiceprint information set, the registration voiceprint characteristic information and the user behavior data included in the registration voiceprint information and the voiceprint identifier of the registration voiceprint information are associated and stored.

Figure 5:
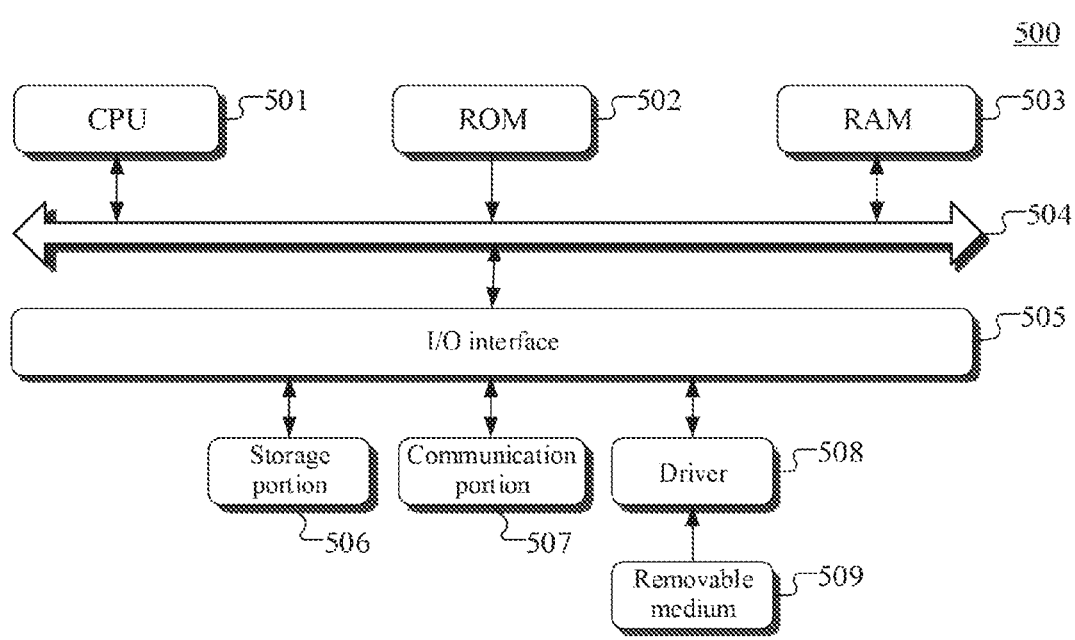
FIG. 5 is a schematic structural diagram of a computer system adapted to implement a server according to embodiments of the present disclosure.

Referring to FIG. 5, a schematic structural diagram of a computer system 500 adapted to implement a server of the embodiments of the present disclosure is shown. The server shown in FIG. 5 is merely an example, but does not impose any restrictions on the function and scope of embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a receiving unit, an extracting unit, a matching unit, and a pushing unit, where the names of these units do not in some cases constitute a limitation to such units themselves. For example, the receiving unit may also be described as "a unit for receiving voice information sent through a terminal by a user".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: receiving voice information sent through a terminal by a user, the voice information including awakening voice information and querying voice information, and the awakening voice information being used to switch the terminal from a standby state to a wake-up state; extracting a voiceprint characteristic from the awakening voice information to obtain voiceprint characteristic information; matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information; and pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for pushing information, comprising:
   receiving voice information sent through a terminal by a user, the voice information including awakening voice information and querying voice information, and the awakening voice information being used to switch the terminal from a standby state to a wake-up state;
   extracting a voiceprint characteristic from the awakening voice information to obtain voiceprint characteristic information;
   matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information;
   pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information;
   determining, in response to the voiceprint characteristic information not successfully matching the registration voiceprint information in the registration voiceprint information set, whether a number of pieces of registration voiceprint information included in the registration voiceprint information set exceeds a preset number threshold;
   in response to determining that the number of pieces of registration voiceprint information exceeds the preset number threshold, deleting registration voiceprint information having least user behavior data in the registration voiceprint information set; and
   establishing registration voiceprint information of the user based on the awakening voice information, and storing the established registration voiceprint information into the registration voiceprint information set,
   wherein the method is performed by at least one processor.

2. The method according to claim 1, wherein the establishing registration voiceprint information of the user based on the awakening voice information comprises:
   importing the awakening voice information into a pre-trained universal background model for mapping to obtain a first voiceprint characteristic super-vector, wherein the universal background model is used to represent a corresponding relationship between voice information and a voiceprint characteristic super-vector;
   performing a dimensionality reduction on the first voiceprint characteristic super-vector to obtain first registration voiceprint characteristic information;
   generating a first voiceprint identifier of the first registration voiceprint characteristic information, and associating and storing user behavior data of the user and the first voiceprint identifier; and using the first registration voiceprint characteristic information, the first voiceprint identifier, and the user behavior data of the user as the registration voiceprint information of the user.

3. The method according to claim 1, wherein the extracting a voiceprint characteristic from the awakening voice information to obtain voiceprint characteristic information comprises:

importing the awakening voice information into a pre-trained universal background model for mapping to obtain a voiceprint characteristic super-vector, wherein the universal background model is used to represent a corresponding relationship between voice information and a voiceprint characteristic super-vector; and performing a dimensionality reduction on the voiceprint characteristic super-vector to obtain the voiceprint characteristic information.

4. The method according to claim 1, wherein the each piece of registration voiceprint information in the registration voiceprint information set further includes a voiceprint identifier corresponding to the registration voiceprint characteristic information; and for the each piece of registration voiceprint information in the registration voiceprint information set, the registration voiceprint characteristic information and the user behavior data included in the registration voiceprint information and the voiceprint identifier of the registration voiceprint information are associated and stored.

5. An apparatus for pushing information, comprising:

at least one processor; and a memory storing instructions, the instructions when executed by the at least one processor, cause the at least one processor to perform operations, the operations comprising:

receiving voice information sent through a terminal by a user, the voice information including awakening voice information and querying voice information, and the awakening voice information being used to switch the terminal from a standby state to a wake-up state;

extracting a voiceprint characteristic from the awakening voice information to obtain voiceprint characteristic information;

matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information;

pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information;

determining, in response to the voiceprint characteristic information not successfully matching the registration voiceprint information in the registration voiceprint information set, whether a number of pieces of registration voiceprint information included in the registration voiceprint information set exceeds a preset number threshold;

in response to determining that the number of pieces of registration voiceprint information exceeds the preset number threshold, deleting registration voiceprint information having least user behavior data in the registration voiceprint information set; and establishing registration voiceprint information of the user based on the awakening voice information, and store the established registration voiceprint information into the registration voiceprint information set.

6. The apparatus according to claim 5, wherein the establishing registration voiceprint information of the user based on the awakening voice information comprises:

importing the awakening voice information into a pre-trained universal background model for mapping to obtain a first voiceprint characteristic super-vector, wherein the universal background model is used to represent a corresponding relationship between voice information and a voiceprint characteristic super-vector;

performing a dimensionality reduction on the first voiceprint characteristic super-vector to obtain first registration voiceprint characteristic information;

generating a first voiceprint identifier of the first registration voiceprint characteristic information, and associating and storing user behavior data of the user and the first voiceprint identifier; and using the first registration voiceprint characteristic information, the first voiceprint identifier, and the user behavior data of the user as the registration voiceprint information of the user.

7. The apparatus according to claim 5, wherein the extracting a voiceprint characteristic from the awakening voice information to obtain voiceprint characteristic information comprises:

importing the awakening voice information into a pre-trained universal background model for mapping to obtain a voiceprint characteristic super-vector, wherein the universal background model is used to represent a corresponding relationship between voice information and a voiceprint characteristic super-vector; and performing a dimensionality reduction on the voiceprint characteristic super-vector to obtain the voiceprint characteristic information.

8. The apparatus according to claim 5, wherein the each piece of registration voiceprint information in the registration voiceprint information set further includes a voiceprint identifier corresponding to the registration voiceprint characteristic information; and for the each piece of registration voiceprint information in the registration voiceprint information set, the registration voiceprint characteristic information and the user behavior data included in the registration voiceprint information and the voiceprint identifier of the registration voiceprint information are associated and stored.

9. A non-transitory computer storage medium storing a computer program, the computer program when executed by one or more processors, causes the one or more processors to perform operations, the operations comprising:

receiving voice information sent through a terminal by a user, the voice information including awakening voice information and querying voice information, and the awakening voice information being used to switch the terminal from a standby state to a wake-up state;

extracting a voiceprint characteristic from the awakening voice information to obtain voiceprint characteristic information;

matching the voiceprint characteristic information and a preset registration voiceprint information set, each piece of registration voiceprint information in the registration voiceprint information set including registration voiceprint characteristic information, and user behavior data of a registration user corresponding to the registration voiceprint characteristic information;

pushing, in response to the voiceprint characteristic information successfully matching the registration voiceprint characteristic information in the registration voiceprint information set, audio information to the terminal based on the querying voice information and user behavior data corresponding to the successfully matched registration voiceprint characteristic information determining, in response to the voiceprint characteristic information not successfully matching the registration voiceprint information in the registration voiceprint information set, whether a number of pieces of registration voiceprint information included in the registration voiceprint information set exceeds a preset number threshold;

in response to determining that the number of pieces of registration voiceprint information exceeds the preset number threshold, deleting registration voiceprint information having least user behavior data in the registration voiceprint information set; and establishing registration voiceprint information of the user based on the awakening voice information, and storing the established registration voiceprint information into the registration voiceprint information set.

* * * * *